United States Patent [19]

Villata et al.

[11] Patent Number: 4,997,071
[45] Date of Patent: Mar. 5, 1991

[54] AUTOMATIC CONTROL SYSTEM FOR A CLUTCH COUPLING TWO ROTATING SHAFTS

[75] Inventors: Gino Villata, Buttegliera d'Asti; Mario Mangano, Turin, both of Italy

[73] Assignee: Valeo, Paris, France

[21] Appl. No.: 198,292

[22] Filed: May 25, 1988

[30] Foreign Application Priority Data

May 27, 1987 [FR] France .................. 87 07520

[51] Int. Cl.$^5$ .................. F16D 25/063; F16D 35/00
[52] U.S. Cl. .................. 192/57; 192/85 AA; 192/103 C; 192/103 F
[58] Field of Search ............... 192/35, 57, 58 A, 58 B, 192/58 C, 85 AA, 103 C, 103 F; 180/249

[56] References Cited

U.S. PATENT DOCUMENTS

| | | | |
|---|---|---|---|
| 2,521,117 | 9/1950 | du Bois et al. | 192/58 B X |
| 2,865,481 | 12/1958 | Teramala | 192/91 A |
| 3,578,120 | 5/1971 | Hilpert | 192/103 C |
| 3,642,107 | 2/1972 | Borman et al. | 192/103 C X |
| 4,057,133 | 11/1977 | Tuzson | 192/103 F |
| 4,727,966 | 3/1988 | Hiramatsu et al. | 192/103 F X |

FOREIGN PATENT DOCUMENTS

| | | |
|---|---|---|
| 228697 | 7/1987 | European Pat. Off. . |
| 249460 | 12/1987 | European Pat. Off. . |
| 3609419 | 10/1986 | Fed. Rep. of Germany .... 192/58 B |
| 0108422 | 4/1989 | Japan .................. 192/58 B |
| 688753 | 3/1953 | United Kingdom . |

Primary Examiner—Rodney H. Bonck
Attorney, Agent, or Firm—Charles E. Brown; Charles A. Brown

[57] ABSTRACT

The invention is concerned with an automatic control system for a clutch for coupling two rotatable shafts. The system comprises a piston for controlling a clutch mounted between two shafts. Control of the piston is obtained through a pressurized fluid which acts according to the position of a slide member which is movable in relative rotation controlled by a coupling device sensitive to a speed difference between the shafts. The invention is applicable to an automotive vehicle so as to put it temporarily into four wheel drive.

9 Claims, 3 Drawing Sheets

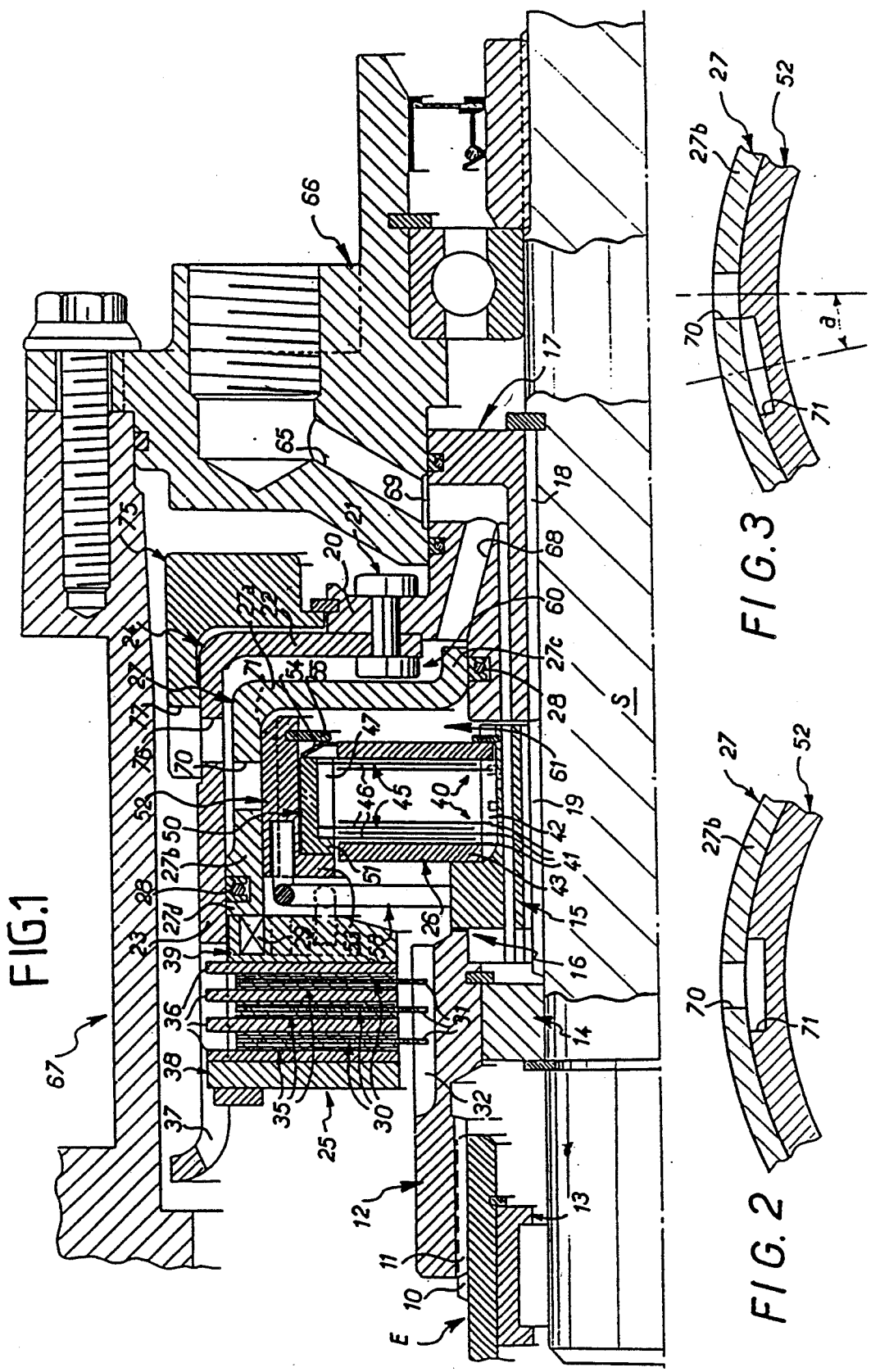

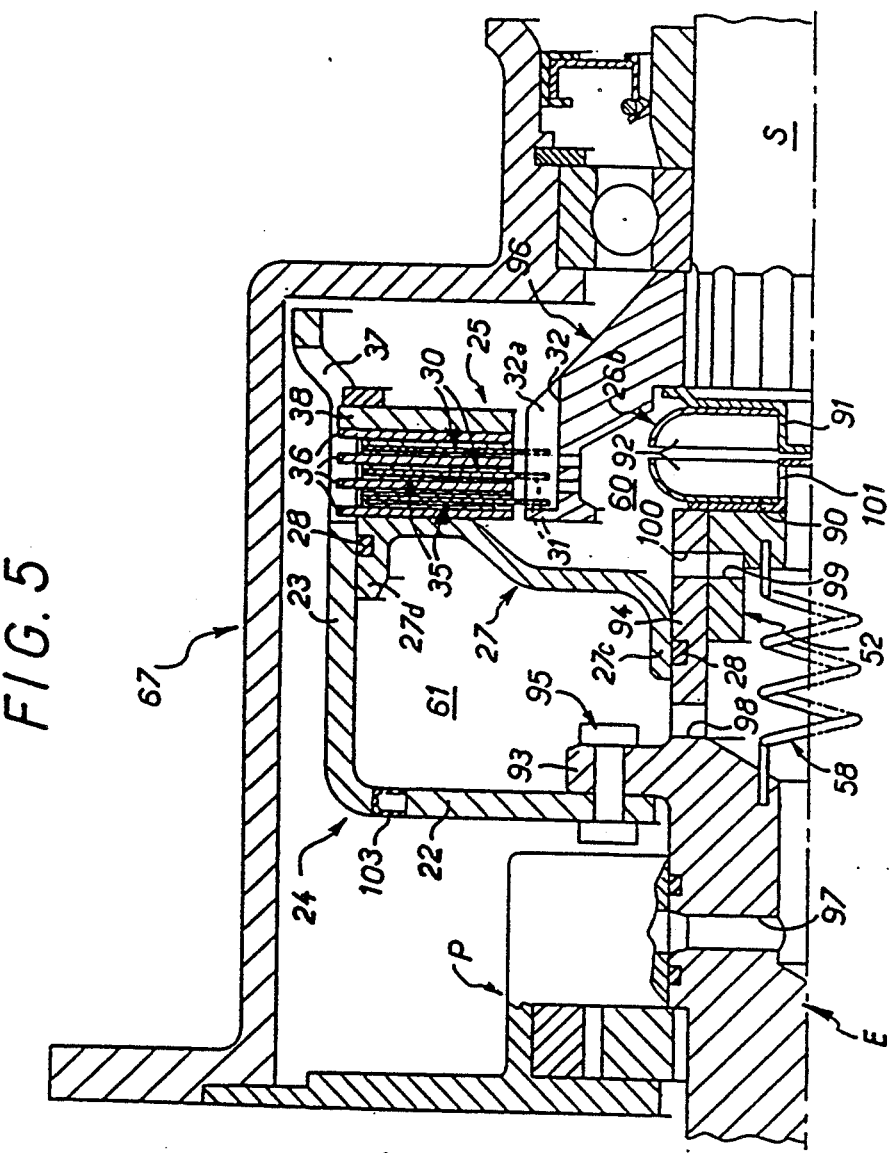
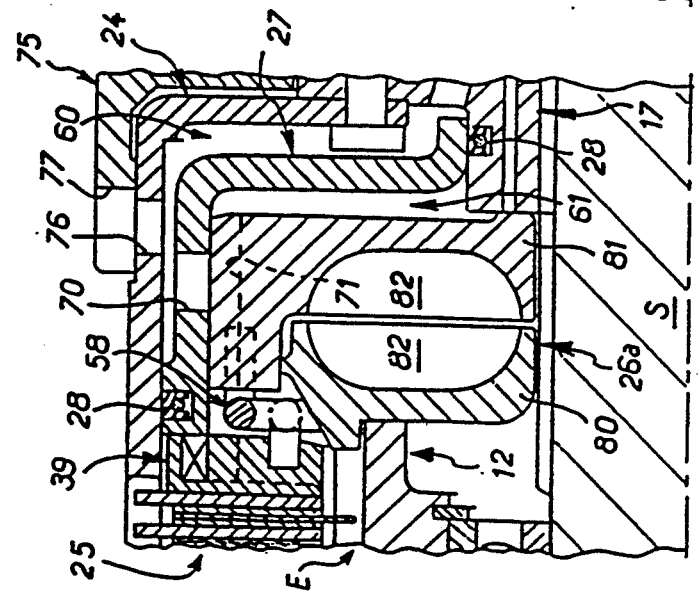

AUTOMATIC CONTROL SYSTEM FOR A CLUTCH COUPLING TWO ROTATING SHAFTS

BACKGROUND OF THE INVENTION

1. Field of the Invention

This invention is concerned generally with an automatic control system for a clutch for coupling two rotatable shafts, and is more particularly directed to an automatic control system for a clutch for an automotive vehicle for coupling between a driven shaft, associated with the front axle for example, and a driven shaft associated with the back axle, so as to apply four wheel drive momentarily and automatically to the vehicle, especially when the front and rear wheels are rotating at different speeds.

2. Description of the Related Art

French Patent No. 2 135 983 describes a torque convertor for a four wheel drive automotive vehicle, operable to allow the engine torque to be divided differentially between the front and rear axles, when a difference in speed occurs between the front and rear wheels. This torque convertor comprises a hydraulic sliding coupling, which produces a torque as a result of a predetermined speed difference. This torque causes the axial displacement of a ring, which in turn acts on the pressure plate of a multi disc clutch mounted between the two shafts.

However, the torque produced by the hydraulic sliding coupling effects direct control of the ring which acts on the clutch, that is to say the hydraulic sliding coupling must itself ensure control of the clutch, and must be capable of transmitting relatively large torques.

Another disadvantage lies in the fact that control of the multi disc clutch is obtained by means of rollers which are displaceable on ramps for causing the displacement of the roller which acts on the pressure plate of the clutch. Such a structure is complex by nature, and requires accurate machining of the ramps so as to prevent any possible jamming of the rollers.

The invention seeks to overcome these disadvantages, and with this in mind proposes generally a system in which, for the mechanical control means, there is substituted hydraulic control of the coupling clutch; at the same time other advantages are obtained.

SUMMARY OF THE INVENTION

The invention proposes an automatic control system for a clutch for coupling two rotatable shafts, of the kind comprising an element, such as a piston, movable axially towards an engagement position for ensuring the axial engagement of at least one friction disc of the said clutch so as to couple the shafts together, and a control device sensitive to a difference in speed between the said shafts whereby to control the displacement of the piston towards its engagement position, characterised in that the control system includes, between the control device and the said piston, a slide member mounted for relative rotational movement with respect to the piston and limited for movement between two positions, namely a first position to which it is biassed by resilient means to inhibit the action of a pressurised fluid on the piston, and a second position in response to the control device and against the resilient means, so as to cause the pressurised fluid to act on the piston, to drive it towards the second position when the speed difference between the shafts reaches a predetermined value.

With this arrangement, the control device, comprising a viscous coupling or hydraulic coupling, has to provide a torque only large enough for the control of the slide member, from the instant at which the pressurised fluid ensures control of the disc clutch.

In another embodiment of the invention, the system also includes a device sensitive to deceleration of the vehicle, particularly during braking, so as to control the automatic disengagement of the clutch, this device comprising an inertia flywheel is also a slide member arranged for relative rotational movement between two positions, in one of which it inhibits the action of the pressurised fluid on the control piston for the clutch.

BRIEF DESCRIPTION OF THE DRAWINGS

FIG. 1 is a cross sectional view in longitudinal elevation of a system according to the invention in a first embodiment, FIGS. 2 and 3 are diagrammatic views allowing the principle of operation of the system shown in FIG. 1 to be explained, FIG. 4 is a view in elevation, shown partly in longitudinal cross section, showing a variant on the first embodiment, FIG. 5 is a view in elevation, in longitudinal cross section, of a system according to the invention in another embodiment.

DESCRIPTION OF THE PREFERRED EMBODIMENTS

Figure 7:
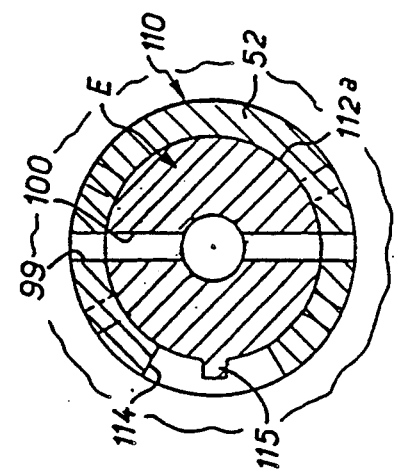
FIG. 7 is a cross sectional view taken on the line VII—VII in FIG. 6.

The automatic control system for a coupling clutch is in this example applied to the temporary coupling of two rotating shafts E and S. The shaft E is for example a drive shaft connected to the gear box of an automotive vehicle so as to drive its road wheels, for example the front axle, while the shaft S is a driven shaft associated with the back axle.

The input shaft E is a hollow shaft which, towards that one of its ends that is remote from the gear box, has splines 10 on its outer periphery, in which are engaged splines 11 provided on the inner periphery of a hub 12 fixed to the shaft E for rotation with the latter.

The output shaft S, which is axially aligned with the input shaft E, engages at one end with the interior of the shaft E through a ring member 13 between the two shafts E and S and a ring member 14 between the shaft S and the hub 12.

The hub 12 is extended axially, in the direction away from the shaft E, by means of a hub 15 which is fixed for rotation with the hub 12 and which is freely mounted around the output shaft S. The two shafts 12 and 15 are fixed together by a joint 16, which may for example be of the tenon and mortice type.

Beyond the hub 15, a further hub 17 is mounted on the output shaft S, to which it is fixed for rotation therewith. To this end, the bore of the hub 17 has splines 18 which engage in splines 19 provided on the outer periphery of the output shaft S.

In its middle part, the hub 17 has an annular flange 20, to which a face plate portion 22 is fixed by means of rivets 21. The face plate portion 22 is extended by a skirt portion 23, which extends axially around the shaft S so as to enclose the two hubs 12 and 15 over substantially the whole of their axial length. The face plate portion 22 and skirt portion 23 together constitute an intermediate coupling element 24 between the two shafts E and S, and in consequence of the foregoing it is fixed to the shaft S for rotation with the latter.

In the annular space defined between the coupling element 24 and the hubs 12, 15 and 17, there are mounted a coupling clutch 25 between the two shafts E and S, a coupling device 26 which is sensitive to the difference between the speeds of rotation of the two shafts E and S, and an axially moveable piston 27.

In greater detail, the clutch 25 is in this example a multi-disc clutch, hydraulically controlled. It comprises a plurality of friction discs 30, there being three of these in this example. These discs 30 are arranged to be rotatable with the input shaft E while being axially free to move with respect to the latter, on which they are mounted by means of a toothed portion 31 provided on their inner periphery and cooperating with ribs 32 extending axially on the outer peripheral surface of the hub 12. Alternating in the axial direction with these discs 30 are interposed discs 35, which are arranged for rotation with the skirt portion 23 while being free to move axially, the discs 35 being carried on the skirt portion 23 by means of a toothed portion 36, which is provided on their outer periphery and which cooperates with slots 37 formed in the skirt portion 23 and extending axially towards the free end of the inner peripheral surface of the skirt portion. The two endmost discs 35 are respectively in engagement against a reaction plate 38, which is carried on the skirt portion 23 for rotation with the latter, and a pressure plate 39 which is fixed for rotation with the adjacent disc 35. These two plates 38 and 39 of the clutch 25 are thus fixed for rotation with the coupling element 24, which is itself rotatable with the shaft S.

In this example the coupling device 26 takes the form of a viscous coupling having two coaxial parts, namely a driving part and a driven part respectively. The driving part comprises a plurality of discs 40, which are mounted on the input shaft E for rotation therewith by means of a toothed portion 41 which is provided on their inner periphery and which cooperates with ribs 42 provided on the hub 15 and extending axially on the outer peripheral surface of hub 16. The two endmost discs 40 are engageable against two annular plates 43, which are rotatable with the hub 15 through their inner periphery. Alternating in the axial direction with these discs 40 are interposed discs 45, which are mounted for rotation through a toothed portion 46 provided on their outer periphery and cooperating with ribs 47 extending axially on the inner peripheral surface of a crown 50, which constitutes the driven part of the coupling device 26.

The crown 50 has an internal radial shoulder 51 at that one of its ends which is adjacent to the pressure plate 39, and it is surrounded by a coaxial hub 52 which constitutes a rotatable slide member. The hub 52 also has an inner radial shoulder 53, which, by contact with the shoulder 51, forms a friction coupling biassed by a resilient means 54, such as a Belleville washer, inserted between the crown 50 and a washer 55 which is fixed to the hub 52.

The piston 27 comprises an annular, radial face plate portion 27a which is mounted around the hub 17, and which is extended on its outer periphery by an axial skirt portion 27b, which extends in the annular space defined between the inner periphery of the skirt portion 23 of the intermediate coupling element 24 and the outer periphery of the slide member 52.

At its inner end, the face plate portion 27a has an axially extending portion 27c, which constitutes the surface of the piston 27 for contact with the outer peripheral surface of the hub 17 defined between the shoulder 20 and the end of the hub 17 which is adjacent to the viscous coupling 26. Towards its free end, the skirt portion 27b of the piston 27 has a shoulder 27d, the outer peripheral surface of which constitutes the surface of the piston for contact with the inner peripheral surface of the skirt portion 23 of the intermediate element 24.

Sealing joints 28 are provided at the level of two surfaces of contact between the piston 27 and the coupling element 24. These joints 28 are mounted in such a way as to exert a sufficient pressure between the piston 27 and the coupling element 24, to ensure that these two members are made rotatable with each other without interfering with the axial displacement of the piston 27. This rotational coupling may also be obtained by means of fingers which extend from the end surface of the skirt portion 23, and which penetrate into recesses provided in the pressure plate 39 as indicated diagrammatically at 29.

A spring 58 is mounted between the pressure plate 39 and the slide member 52, with its two ends respectively fixed to the plate and the slide member.

Two annular chambers 60 and 61 are thus defined on either side of the piston 27, the chamber 60 being between the face plate portion 27a and the face plate portion 22, while the chamber 61 lies between the piston 27 and the viscous coupling 26.

The chamber 60 is in communication with a source of fluid under pressure (not shown), through a hydraulic circuit comprising a first duct 65, which is formed by machining, in a fixed portion 66 of the casing 67 of the engine of the automotive vehicle. The duct 65 is in communication with one end of a duct 68, formed by machining in the rotatable hub 17. The other end of the duct 68 leads into the chamber 60. The two ducts 65 and 68 communicate with each other through an annular groove 69 provided in the fixed portion 66 of the engine casing 67.

The two chambers 60 and 61 may communicate with each other through a plurality of orifices 70 which are provided in the skirt portion 27b of the piston 27, and through a plurality of axial grooves 71 which are provided on the outer peripheral surface of the slide member 52. The grooves 71 extend along the entire length of the latter. According to the position taken up by the slide member 52, the orifices 72 are either in or out of communication with the grooves 71, as will be described further on.

The system is completed by a device which is sensitive to a sharp deceleration of the vehicle, such as that which results from application of the brakes for example, and which automatically causes the shafts E and S to become uncoupled from each other, provided of course that these shafts were already coupled together.

This device comprises an annular flywheel 75 which is mounted around the coupling element 24, and a spring (not shown), which is similar to the spring 58 and the two ends of which are respectively fixed to the element 24 and the flywheel 75. Orifices 76 are provided in the skirt portion 23, and are therefore in communication with the chamber 60, while openings 77 are provided in the flywheel 75, these orifices 76 and 77 being in relative positions in which they either face each other or do not face each other, according to the relative position of the flywheel 75 with respect to the coupling element 24, as will be described below.

The pressurised fluid which serves to control the piston 27 has a certain viscosity, and acts, on the one hand as the fluid necessary for the operation of the viscous coupling 26, and on the other hand as the cooling fluid for the discs 30 and 35 and for the clutch 25.

Now suppose that the two shafts E and S are uncoupled, that is to say that they are turning at substantially the same speed.

In its rotation, the input shaft E carries with it the hub 12, the friction discs 30, the hub 15 and the discs 40. The output shaft S carries in rotation with it the hub 17, the coupling element 24, the discs 35, the piston 27, the slide member 52, the crown 50 and the discs 45.

When the system is in this condition, the clutch 25 is in a disengaged position, and the fluid present in the visous coupling is put in shear by the discs 40 and 45.

In practice, only small relative movements can take place between the discs 40 and 45, particularly when the vehicle is executing a turn, but they are not large enough to produce a torque that is capable of actuating the slide member 52.

In addition, the slide member 52 occupies a first relative position with respect to the piston 27, as a result of which the grooves 71 of the slide member are in communication with the orifices 70 of the piston 27 (FIG. 2). Under these conditions, the chamber 60, which is supplied continuously with fluid under pressure through the ducts 65 and 68, is in communication with the chamber 61, and the same pressure exists on both sides of the face plate portion 27a of the piston 27. The fluid therefore circulates freely between the fluid source and a reservoir (not shown). The piston 27 is in a first axial position, in which it exerts no force on the pressure plate 39 of the clutch 25, and this position is maintained under the action of the spring 58. The control system is inactive or in a rest position.

Suppose now that a difference between the speeds of the shafts E and S occurs, this difference being the result of for example, of a front wheel skidding due to loss of adhesion. This difference in speed, transmitted on to the two parts of the coupling 26, results in shear forces being set up by the fluid, and therefore in the generation of a torque which opposes the relative rotation of the discs 40 and 45. This torque is transmitted to the slide member 52 through the friction coupling that exists between the slide member 52 and the crown 50; and when this torque becomes greater than the biassing force of the springs 58, the slide member 52 performs a relative rotational movement through an angle a, for example, with respect to the piston 27 (FIG. 3). This rotational movement is enough to cause the grooves 71 in the slide member 52 to become partially or totally disengaged from the orifices 70 in the piston 27.

Under these conditions, the progressive closing of the communication between the two chambers 60 and 61 result in the pressure of the fluid in the chamber 60 being increased until it becomes sufficient to cause the piston 27 to become axially displaced in the direction of the pressure plate 39, which causes the discs 30 and 35 to be gripped. In this way, a sliding coupling is obtained between the shafts E and S. The control system is now in operation, and the vehicle is in four wheel drive.

When the torque produced by the viscous coupling 26 is reduced, and becomes once more insufficient to overcome the biassing force of the spring 58, the slide member returns to its initial position under the action of the spring 58. The chambers 60 and 61 are once again brought, progressively or instantaneously, into communication with each other. When the piston 27 is thereby no longer biassed by the fluid so as to exert sufficient pressure on the pressure plate 39, the vehicle reverts to two wheel drive and the system is once again in its rest position.

Now suppose that the system is active and that the driver of the vehicle has to brake hard. Under these conditions, when the deceleration resulting from braking is greater than a predetermined value, it produces a sufficiently large torque to set the flywheel 75 in relative rotation with respect to the coupling element 24. This rotational movement results in the orifices 76 being brought into communication with the orifices 77, and as a result the chamber 61 is now under pressure and in communication with the reservoir. The fluid escapes, the pressure diminishes instantaneously in the chamber 60, and the piston 27 no longer exerts the pressure necessary to grip the discs 30 and 35 of the clutch 25. In consequence this clutch becomes disengaged. Similarly, the spring 58 returns the slide member 52 into its initial position. The escape of the fluid contained in the chamber 60 through the orifices 76 of the skirt 23 allows all the residual pressure, which could act on the piston 27, to be eliminated.

In the variant show in FIG. 4, the viscous coupling 26 has been replaced by a hydraulic coupling 26a, which is also sensitive to a difference in speed between the two shafts E and S. This coupling 26a, which is mounted around the output shaft S, has two parts 80 and 81 which are arranged to be facing each other, and each of which has vanes 82 for shearing the fluid.

The part 80 is fixed to the hub 12 coupled in rotation with the input shaft E, while the part 81 also performs the function of the slide member 52 in the preceding example, and has axial grooves 71 on its outer periphery. The grooves 71 are, according to the position of the sliding member, either in communication or out of communication with the orifices 70 in the piston 27. The two ends of the spring 58 are fixed respectively to the part 81 and to the pressure plate 39. The spring 58 causes the part 81 to be coupled in rotation with the plate 39, which is itself connected to the coupling element 24 which is coupled in rotation to the output shaft S. It also permits relative rotational movement of the part 81, and thus of the slide member 52, with respect to the piston 27 when the torque produced by the coupling is greater than the biassing force exerted by the spring 58.

The operation is similar to that of the system described previously. A difference in speed between the shafts E and S is detected by the hydraulic coupling 26a, which produces a torque which controls the rotation of the slide member 52 so as to pressurise the chamber 60, and to control the axial displacement of the piston 27 which causes the discs of the clutch 25 to become engaged.

In the variant shown in FIG. 5, the viscous coupling is again replaced by a hydraulic coupling, 26b.

Figure 6:
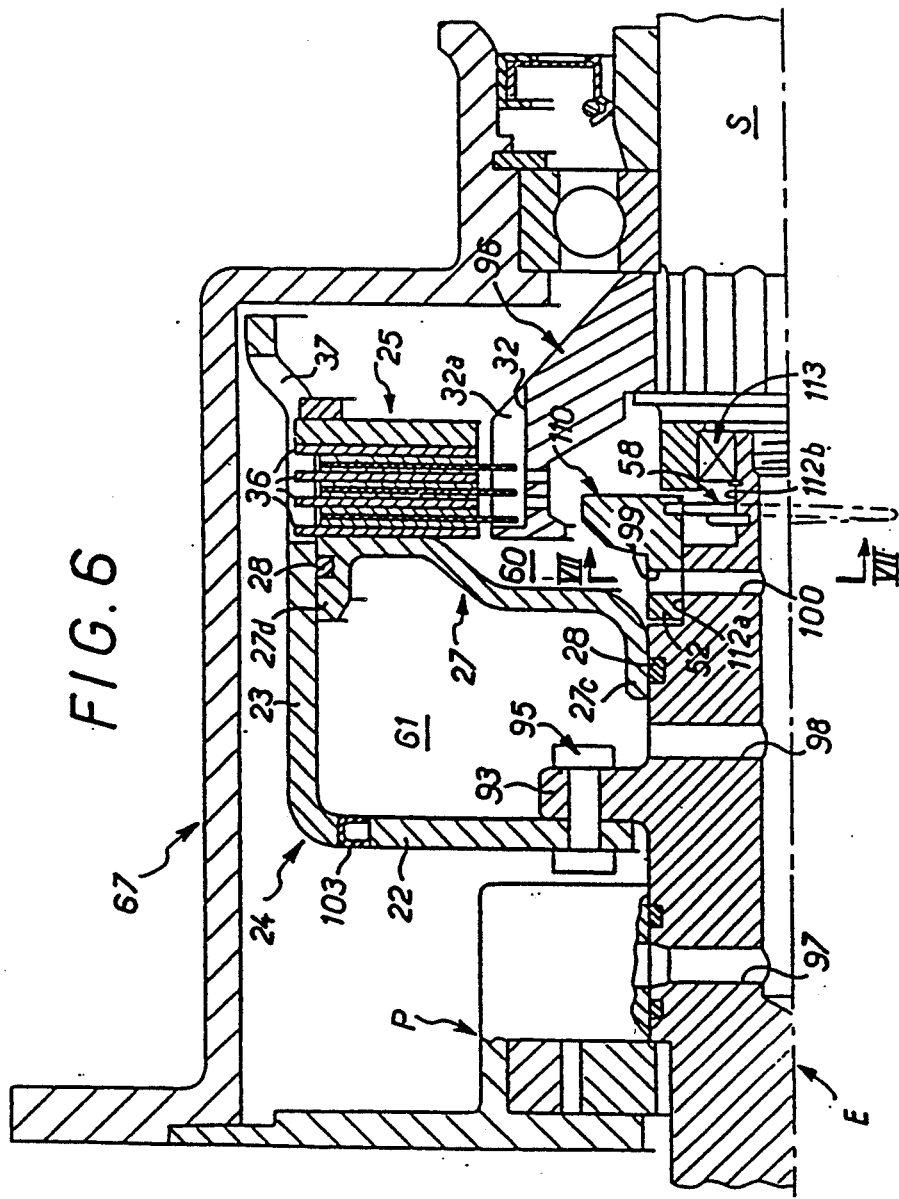
FIG. 6 is a view in elevation, in longitudinal cross section, of a system according to the invention in a final embodiment.

The coupling 26b comprises two parts 90 and 91, each of which carries rotatable vanes 92 which are mounted so as respectively to face each other, and which circulate the fluid contained in the interior of the coupling. The part 90 is fixed to a slide member 52 fixed on the inside of the shaft E, and the part 91 of the coupling is fixed to the end of the shaft S adjacent to the shaft E. Near its end portion, shaft E has a radial flange 93, the said terminal portion being an axially extending ring portion or crown 94. To the flange 93, there is fixed, for example by means of rivets 95, a radial ring portion 22 of an intermediate coupling element 24, which is extended in the axial direction by a skirt portion 23 extending in the direction of the output shaft S. The multi-disc clutch 25 is mounted between the skirt portion 23 and an annular support ring 96 which includes a hub carried on the end of the shaft S. As shown in FIGS. 5 and 6, the clutch 25 is mounted by means of a set of teeth 31 provided on the inner periphery of the discs 30 which engage with ribs 32 provided on the outer periphery of the hub 96, and also by means of a set of teeth 36 provided on the outer periphery of the interposed discs 35, which engage with axial slots 37 formed in the inner periphery of the skirt portion 23.

Between the clutch 25 and the radial ring portion 22, there is disposed an annular piston 27, which makes sliding contact with the inner periphery of the skirt portion 23 through one of its extremities, 27d, and with the outer peripheral surface of the crown 94 through its other extremity, 27c. These sliding contacts are made with the aid of sealing joints 28, which, as in the preceding example, exert a contact pressure which is sufficiently large to entrain the piston 27 for rotation with the coupling element 24 without hindering the axial displacement of the piston in the direction of the clutch discs 25. Two chambers 60 and 61 are thus defined on either side of the piston 27.

The slide member 52 takes the form of a hub arranged within the crown 94, with the outer peripheral surface of the slide member making contact with the inner peripheral surface of the crown 94. The part 90 of the coupling 26b is fixed to the adjacent end surface of the slide member 52. A spring 58 is mounted within the shaft E, with its two ends respectively fixed to the shaft E and to the slide member 52. The latter is thus coupled in rotation with the shaft E, so that it is movable in relative rotation with respect to the crown 94.

The fluid under pressure in supplied by a pump P which is gear type pump and which is mounted on the input shaft E. The fluid is supplied through a radial duct 97 to the interior of the hollow end portion of the shaft E, this end portion being in permanent communication with the chamber 61 through first orifices 98 provided in the crown 94. The said interior of the shaft E communicates, according to the position of the slide member 52, with the chamber 60 when a set of orifices 99, which are provided in the slide member 52, lie facing a set of second orifices 100. The orifices 100 are provided in the crown 94, and the orifices 58 and 100 are respectively situated on either side of the piston 27. The fluid penetrates into the coupling 26b through an orifice 101 provided in the coupling part 91.

When the system is in its rest position, the pump supplies the chamber 60 with fluid under pressure through the orifices 99 and the orifices 100, these orifices being in communication with each other in a first position of the slide member 52. The chamber 61 is supplied with fluid through the orifices 98, while the hydraulic coupling is supplied through the orifices 101. The two chambers 60 and 61 are at substantially the same pressure, and the piston 27 exerts no force on the discs 35 of the clutch 25, which is in its disengaged position. A certrifugal valve 103, mounted in the wall of the coupling element 24, allows the fluid to escape from the chamber 61, the pressure being insufficient to close the valve 103.

At the instant at which the rotational speeds of the shafts E and S become different from each other, a torque arises in the hydraulic coupling 26b, and when this torque has a value greater than the biassing force exerted by the spring 58, it causes the slide member 52 to undergo relative rotation with respect to the crown 94 of the shaft E. The effect of this rotation is to disengage the orifices 99 and 100 from each other, and to isolate the chamber 60 from the fluid source P. The pressure in the chamber 61 therefore increases, so as to close the valve 103 and cause the piston 27 to become displaced axially, which in turn causes the discs 30 and 35 of the clutch 25 to become engaged. When the said torque disappears, the spring 58 returns the slide member 52 to its initial position.

In the final embodiment, shown in FIGS. 6 and 7, the system according to the invention is more particularly sensitive to acceleration of the automotive vehicle, so as to cause coupling to take place between the two shafts E and S under the control of the inertia of a flywheel 110.

This last embodiment has a structure very similar to that of FIG. 5, the hydraulic coupling 26b being replaced by the flywheel 110.

Adjacent to its end portion, the input shaft E has two successive radial shoulders, bounding respectively two annular circumferential surfaces 112a and 112b. The inertia flywheel 110 is mounted around the surface 112a, and extends partly beyond this surface. The portion of the flywheel 110 which engages the surface 112a constitutes a slide member 52 provided with radial orifices 99, which communicate with the chamber 60 and which, according to the position of the flywheel 110 with respect to the shaft E, are either in communication or out of communication with the radial ducts 100 of the shaft E, which communicate with the pump P. Between the flywheel 110 and the surface 112b of the shaft E, there is mounted a spring 58 which is anchored at its two ends to the flywheel and to the shaft respectively. The output shaft S, which is axially aligned with the shaft E, is centred by means of a bearing 113.

Referring to FIG. 7, it should be noted that the slide member 52 has a slot 114 in its outer periphery. A radial lug 115, projecting from the outer periphery of the shaft E, engages loosely in the slot 114. This lug 115 allows relative rotational movement between the slide member 52 and the shaft E to be limited.

In the event of an acceleration which is reproduced in the input shaft E or a driving shaft, when the road wheels associated with this shaft have lost adhesion in the situation where the acceleration results from the vehicle skidding, the flywheel 110, being sensitive to this acceleration, causes the slide member 52 fixed to the flywheel to rotate with respect to the shaft E, from the instant at which this acceleration becomes sufficiently large to overcome the biassing force of the spring 58. This rotational movement interrupts the communication between the orifices 99 of the valve 52 and the shaft ducts 100 which are connected to the source P. The pressure in the chamber 61 then increases, so closing the centrifugal valve 103 and causing the piston 27 to become displaced axially towards the position in which the discs 30 and 35 of the clutch 25 are engaged.

In an alternative arrangement, the resilient means 58, which are associated with the rotatable slide member 52, may comprise spiral springs. In the embodiment shown in FIG. 1, it should be noted that the presence of the hub 50 associated with the slide member 52 allows the torque that is transmitted when the difference in speed of rotation between the shafts E and S become excessive to be limited. It is also possible to provide a different fluid for the operation of the viscous coupling, but in that case it is necessary to provide appropriate sealing.

The choice of the value of the speed difference between the shafts E and S at which the system begins to operate, is made in such a way that the differences in speed which may occur under normal operating conditions of the vehicle, and particularly during braking, are not large enough to activate the system.

The use of a hydraulic coupling such as 26a or 26b allows a torque to be produced which is a function of the square of the speed, whereas for viscous coupling, the torque is only proportional to the linear speed.

It should be noted that it is possible to ensure that the maximum transmitted torque be modulated, that is to say to ensure that the torque shall be divided between the two axles of the vehicle, by operating on the supply pressure of the pressurised fluid. This pressure can be set by the driver according to the way in which he drives or according to the state of the ground, or it may be set automatically according to the load on the axle which is connected with the output shaft S.

It will also be noted that the embodiments according to the invention occupy little axial space, and that the use of the available space is optimised by locating the slide member 52 and the coupling member in the space bounded by the piston, for example as in FIGS. 1 and 4.

What is claimed is:

1. An automatic control system for a clutch for coupling two rotatable shafts, of the kind comprising a piston movable axially under the influence of a pressurized fluid towards an engagement position for ensuring the axial engagement of at least one friction disc between a pressure plate and a reaction plate of said clutch so as to couple said shafts together, and a control device sensitive to a difference in speed between said shafts to control the action of the pressurized fluid in displacing said piston towards its engagement position, wherein said control system includes, between said control device and said piston, a slide member mounted for relative rotational movement with respect to the pistion and limited for movement between two positions, namely a first position to which it is biassed by resilient means to inhibit the action of the pressurized fluid on said piston, and a second position in response to said control device and against said resilient means, so as to cause the pressurized fluid to act on said piston when the speed difference between said shafts reaches a predetermined value, said resilient means comprising a spring having two ends which are respectively fixed to said pressure plate of the clutch and to said slide member.

2. A system according to claim 1, wherein said piston comprises a radial face plate portion extended by an axial skirt portion having its end adjacent to the pressure plate of said clutch, and said slide member is on the one hand in contact through its outer periphery with the inner periphery of said skirt portion of the piston, and on the other hand fixed to a hub constituting one of the parts of said control device which acts as a coupling device, the other part of which is fixed to one of said shafts for rotation therewith.

3. A system according to claim 2, wherein said skirt portion of the piston has at least one orifice which is in or out of communication, depending on the position of the said slide member, with at least one axial groove provided on outer periphery of said slide member said orifices being in permanent communication with a source of pressurised fluid.

4. An automatic control system for a clutch for coupling two rotatable shafts, of the kind comprising a piston movable axially under the influence of a pressurized fluid towards an engagement position for ensuring the axial engagement of at least one friction disc of said clutch so as to couple said shafts together, and a control device with a hub sensitive to a difference in speed between said shafts to control the action of the pressurized fluid in displacing said piston towards its engagement position, wherein said control system includes, between said control device and said piston, a slide member mounted for relative rotational movement with respect to the piston and limited for movement between two position, namely a first postion to which it is biassed by resilient means to inhibit the action of the pressurized fluid on said piston, and a second position in response to said control device and against said resilient means so as to cause the pressurized fluid to act on the piston when the speed difference between said shafts reaches a predetermined value; and further comprising an intermediate coupling element comprising a radial ring portion fixed to one of said shafts and extended by an axial skirt portion having an inner periphery in contact with the outer periphery of said slide member, said clutch being mounted between said skirt portion and said shaft.

5. A system according to claim 4, wherein friction joints are mounted between said skirt portion of the coupling element and said piston, these friction joints being such as to ensure that said piston rotates with the coupling element without interference with the axial displacement of the piston.

6. A system according to claim 4, wherein said hub of the control device is coupled for rotation with said slide member through a friction coupling.

7. An automatic control system for a clutch for coupling two rotatable shafts, of the kind comprising a piston movable axially under the influence of a pressurized fluid towards an engagement position for ensuring the axial engagement of at least one friction disc of said clutch so as to couple said shafts together, and a control device sensitive to a difference in speed between said shafts to control the action of the pressurized fluid in displacing said piston towards its engagement position, wherein said control system includes, between said control device and said piston, a slide member mounted for relative rotational movement with respect to the piston and limited for movement between two positions, namely a first position in which it is biassed by resilient means to inhibit the action of the pressurized fluid on said piston, and a second position in response to said control device and against said resilient means, so as to cause the pressurized fluid to act on the piston when the speed difference between said shafts reaches a predetermined value; and further comprising a device sensitive to a deceleration of one of said shafts and comprising an inertia flywheel mounted around an intermediate coupling element and movable in relative rotation with respect to said element, and resilient means for limiting said relative rotational movement between two positions.

8. A system according to claim 7, wherein said flywheel comprises at least one orifice which is either in or out of communication with at least one orifice of said coupling element according to the position of said flywheel.

9. A system according to claim 8, wherein said flywheel inhibits the action of the fluid on said piston, when said orifices communicate with each other.

* * * * *